United States Patent
Sleijster et al.

(10) Patent No.: US 10,597,472 B2
(45) Date of Patent: Mar. 24, 2020

(54) IN-LINE BLENDING PROCESS (71) Applicant: Borealis AG, Vienna (AT)

(72) Inventors: Henry Sleijster, Echt (NL); Mohammad Al-Haj Ali, Helsinki (FI); Jukka Rasanen, Porvoo (FI); Samuli Zitting, Tuusula (FI); Michiel Bergstra, Berchem (BE); Erik Eriksson, Stenungsund (SE); Christof Wurnitsch, Neufelden (AT); Guhan Mathivanan, Linz (AT); Sameer Vijay, Linz (AT); Vasileios Kanellopoulos, Linz (AT); Jani Aho, Helsinki (FI); Jouni Takakarhu, Helsinki (FI)

(73) Assignee: BOREALIS AG, Vienna (AT)

( * ) Notice: Subject to any disclaimer, the term of this patent is extended or adjusted under 35 U.S.C. 154(b) by 124 days.

(21) Appl. No.: 15/776,095

(22) PCT Filed: Dec. 21, 2016

(86) PCT No.: PCT/EP2016/082184
§ 371 (c)(1),
(2) Date: May 15, 2018

(87) PCT Pub. No.: WO2017/108951
PCT Pub. Date: Jun. 29, 2017

(65) Prior Publication Data
US 2018/0327529 A1    Nov. 15, 2018

(30) Foreign Application Priority Data
Dec. 21, 2015 (EP) .................................. 15003632

(51) Int. Cl.
*C08J 11/02* (2006.01)
*C08F 6/10* (2006.01)
(Continued)

(52) U.S. Cl.
CPC .............. *C08F 210/14* (2013.01); *C08F 2/06* (2013.01); *C08F 6/003* (2013.01); *C08F 6/12* (2013.01);
(Continued)

(58) Field of Classification Search
None
See application file for complete search history.

(56) References Cited

U.S. PATENT DOCUMENTS

2009/0076216 A1*  3/2009  Kiss ........................ C08F 10/00
                                                              524/579
2009/0163642 A1   6/2009  Kiss et al.
(Continued)

FOREIGN PATENT DOCUMENTS

WO   WO 2009/035580 A1   3/2009

OTHER PUBLICATIONS

Stewart, M. and Arnold, K. "Gas-Liquid and Liquid-Liquid Separators". Gulf Professional Publishing. 2008. (Year: 2008).*
(Continued)

*Primary Examiner* — Richard A Huhn
(74) *Attorney, Agent, or Firm* — Fay Sharpe LLP (57) ABSTRACT

An in-line blending process for polymers comprising: (a) providing two or more reactor-low pressure separator units (1,7) in parallel configuration, each reactor-low pressure separator unit comprising one reactor (2,8) fluidly connected to one low pressure separator (3,9) downstream and further a recycling line (5,11) connecting the low pressure separator (3,9) back to the corresponding reactor (2,8); (b) polymerizing olefin monomers having two or more carbon atoms in each of the reactors (2,8) in solution polymerisation; (c) forming an unreduced reactor effluents stream including a homogenous fluid phase polymer-monomer-solvent mixture in each of the reactors (2,8), (d) passing the unreduced
(Continued)

reactor effluents streams from each of the reactors (2,8) through the corresponding low pressure separators (3,9), whereby the temperature and pressure of the low pressure separators (3,9) is adjusted such that a liquid phase and a vapour phase are obtained, whereby yielding a polymer-enriched liquid phase and a polymer-lean vapour phase, and (e) separating the polymer-lean vapour phase from the polymer-enriched liquid phase in each of the low-pressure separators (3,9) to form separated polymer-lean vapour streams and separated polymer-enriched liquid streams; (f) combining the polymer-enriched liquid streams from step (e) in a further low-pressure separator and/or a mixer (13) to produce a combined polymer-enriched liquid stream (16); (g) reintroducing the polymer-lean vapour streams from step (e) via recycling lines (5,11) into the corresponding reactors (2,8).

19 Claims, 1 Drawing Sheet

(51) Int. Cl.
*C08F 210/14* (2006.01)
*C08F 6/00* (2006.01)
*C08F 2/06* (2006.01)
*C08F 6/12* (2006.01)
*C08F 10/00* (2006.01)
*C08F 210/02* (2006.01)
*B01D 1/14* (2006.01)
*B01D 1/00* (2006.01)

(52) U.S. Cl.
CPC ............ *C08F 10/00* (2013.01); *C08F 210/02* (2013.01); *C08J 11/02* (2013.01); *B01D 1/0064* (2013.01); *B01D 1/0082* (2013.01); *B01D 1/14* (2013.01); *C08F 6/001* (2013.01); *C08F 6/10* (2013.01); *Y02P 20/582* (2015.11)

(56) References Cited

U.S. PATENT DOCUMENTS

| | | | |
|---|---|---|---|
| 2009/0163643 A1* | 6/2009 | Kiss | C08L 23/0815 524/528 |
| 2009/0259005 A1* | 10/2009 | Kiss | C08F 6/001 526/68 |
| 2016/0229930 A1* | 8/2016 | Price | C08F 6/003 |

OTHER PUBLICATIONS

International Search Report dated Mar. 29, 2017 from PCT/EP2016/082184.

* cited by examiner

IN-LINE BLENDING PROCESS

This is a 371 of PCT Patent Application Serial No. PCT/EP2016/082184 filed Dec. 21, 2016, which claims priority to European Patent Application Serial No. 15003632.5 filed Dec. 21, 2015, the entire contents of which are incorporated herein by reference.

The present invention pertains to an in-line blending process for two reactors operated in parallel configuration for the production of polymers.

In traditional polymer production, reactors are operated in series. Such operation allows the use of different process conditions, whereby the properties of the polymers produced in the individual reactor can be modified. Within certain limits, it is possible to modify for example the molecular weight distribution of the total material, i.e. the material produced in all reactors. However, the individual polymerization of polymers independent from a further step is as such desirable as there are more possibilities of adapting the microstructure when there is no need for considering a second or third step. For example, if a bimodal polyolefin shall be produced, the material carried over from one reactor to the other still will be active, i.e. the remaining catalyst activity will determine the options for the second reactor product. The addition of further and optionally different catalyst still cannot remedy the dependencies.

When operating two or more reactors in parallel configuration, the blending process is crucial for homogeneity of the final blends. It is well known that blending of resins having very different molecular weight is quite limited with existing processes. In addition to that traditional blending process are inacceptable for liquid polymerization, whereby the temperature is above the melting point of the polymer automatically resulting in very short residence times in the reactors. In other words, the blending process becomes a significant factor in terms of space-time-yield.

WO 2009/035580 A1, US 2009/163643 A1 and US 2009/163642 A1 disclose blending processes in which homogenous liquid polymer mixtures polymerized in parallel solution polymerization are separated in single or multiple liquid-liquid high pressure separators. However, these processes have the disadvantage that the polymer concentration in the polymer-enriched liquid streams is rather low so that additional downstream separators are necessary to obtain the pure polymer. Additionally, due to the high pressures in the separation process of usually at least 5 MPa unwanted polymerization downstream the reactors can occur which necessitates killing of the polymerization catalysts usually with polar substances. Said catalyst killers complicate monomer recovery from the polymer-lean streams.

The present invention is based on the finding that the shortcomings of the existing prior art blending processes can be overcome when each of the reactors is independently coupled with a low pressure separator including also a recycling line connecting only the reactor and the low pressure separator.

The present invention insofar provides an in-line blending process for polymers comprising:
(a) providing two or more reactor-low pressure separator units (1,7) in parallel configuration, each reactor-low pressure separator unit comprising one reactor (2,8) fluidly connected to one low pressure separator (3,9) downstream and further a recycling line (5,11) connecting the low pressure separator (3,9) back to the corresponding reactor (2,8);
(b) contacting in the two or more reactors of each reactor-low pressure separator unit (1,7)
  1) olefin monomers having two or more carbon atoms,
  2) one or more catalyst systems,
  3) optional one or more comonomers,
  4) optional one or more chain transfer agents, and
  5) optional one or more diluents or solvents,
  wherein the reactors (2,8) are operated under operating conditions which ensure that the reactor contents form a single homogenous phase, the reactor contents comprising the olefin monomers, any comonomer present, any diluent or solvent present, any chain transfer agent present, and the polymer product;
  whereby the catalyst system for each reactor comprises one or more catalyst precursors, one or more activators, and optionally, one or more catalyst supports;
(c) forming an unreduced reactor effluents stream including a homogenous fluid phase polymer-monomer-solvent mixture in each of the reactors (2,8),
(d) passing the unreduced reactor effluents streams from each of the reactors (2,8) through the corresponding low pressure separators (3,9),
  whereby the temperature and pressure of the low pressure separators (3,9) is adjusted such that a liquid phase and a vapour phase are obtained, whereby yielding a polymer-enriched liquid phase and a polymer-lean vapour phase, and
(e) separating the polymer-lean vapour phase from the polymer-enriched liquid phase in each of the low-pressure separators (3,9) to form separated polymer-lean vapour streams and separated polymer-enriched liquid streams;
(f) combining the polymer-enriched liquid streams from step (e) in a further low-pressure separator and/or a mixer (13) to produce a combined polymer enriched liquid stream (16),
(g) reintroducing the polymer-lean vapour streams from step (e) via recycling lines (5,11) into the corresponding reactors (2,8).

An in-line blending process for polymers involves continuous mixing of two or more intermediate polymers optionally having different nature to obtain a final polymer. In-line blending processes stand opposite to traditional batch-blending processes. In batch-blending processes, the final product is created by combining different intermediate products from storage tanks in a blender.

A reactor-low pressure separator unit includes a reactor and a low pressure separator and connecting lines. In the simplest embodiment there is only one reactor. However, it is also possible to have two or more reactors coupled in series although this is usually not preferred.

A reactor according to this invention can be any reactor suitable for polymerization which can be operated in continuous mode. Such reactors are well known in the art. Suitable examples are, amongst others, autoclave or stirred tank reactors operating in continuous mode or tubular reactors.

Corresponding reactor indicates that a first reactor is only coupled to a first low pressure separator with a second reactor being only coupled to a second low pressure separator.

A low pressure separator denotes a unit for separating volatile components from a relatively dilute polymer solution. The volatile components are typically present in an amount of from about 10 to about 90% by weight of the solution. In the low pressure separator a liquid phase, comprising the polymer dissolved therein, and a vapour phase coexist. Preferably, the low pressure separator is operated at a pressure of up to 20 bar, such as from 1 to 15 bar (absolute pressure), and preferably from 2 to 12 bar (absolute pressure). Low pressure separators are well known for several decades. The formation of two phases results in a polymer-enriched liquid phase and a polymer-lean vapour phase. The polymer lean vapour phase which contains unreacted monomer, solvent and traces polymer as well as heavy comonomer if present has a density of 100 kg/m³ or less.

A low pressure separator stands opposite to separation at the lower critical solution temperature (LCST), where both the polymer-rich phase and polymer-lean phase are either substantially liquids or supercritical fluids.

The low pressure separator being downstream fluidly connected to the reactor means that the low pressure separator is arranged such that the reaction mixture produced in the reactor can be collected. The connection usually is simply a pipe optionally equipped with means for control and/or transport and/or heating.

The recycling line connecting the reactor and the corresponding low pressure separator according to the present invention allows the feed of separated monomer(s) back to the reactor.

The recycling line according to the present invention connects only the reactor and the low pressure separator both forming the reactor-low-pressure separator unit. For example if there is a first reactor-low-pressure separator unit including a reactor A and a low pressure separator A' and a second reactor-low-pressure separator unit including a reactor B and a low pressure separator B', there are only recycling lines between reactor A and low pressure separator A' and reactor B and low pressure separator B'. A connection between reactor A and a low pressure separator B' is forbidden.

Catalyst systems according to the present invention denote catalyst or catalyst precursor, co-catalyst if present, activators if present, catalyst supports if present, and external donors of present.

A chain transfer agent is a substance able to react with growing polymer chain by which the activity of the growing polymer chain is transferred. The most common chain transfer agent in polyolefin polymerization is hydrogen. Chain transfer reactions reduce the average molecular weight of the final polymer.

The polymerization system being in its dense fluid state means that the polymerization is a solution polymerization. This means the monomer(s) and optionally present comonomer(s) are dissolved in a non-reactive solvent containing the catalyst system. The polymerization results in a polymer which is also soluble in the chosen solvent.

An unreduced reactor effluents stream according to the present invention is the effluents stream originating directly from the reactor without any treatment resulting in concentration changes.

A homogenous fluid phase polymer-monomer-solvent mixture indicates the absence of phase separation.

Polymer-enriched phase has to be understood relative to the unreduced reactor effluent including a homogenous fluid phase polymer-monomer-solvent mixture. The phase is polymer-enriched if the amount of polymer relative to the total mixture is higher than in the unreduced reactor effluents stream.

A polymer-lean phase results when splitting the unreduced reactor effluents stream into a polymer-enriched phase and a polymer-lean phase. A polymer-lean phase denotes any phase having a lower polymer content with respect to the mixture than the polymer content of the unreduced reactor effluents stream. The polymer-lean phase which contains unreacted monomer, solvent and traces polymer as well as heavy comonomer if present has a density of 100 kg/m³ or less.

The terms polymer-lean vapour phase and polymer-enriched liquid phase indicate that in the present invention the polymer-lean phase is a vapour phase and the polymer-enriched phase is a liquid phase.

The terms polymer-lean vapour phase and polymer-enriched liquid phase also have to be understood as indicating a relation. A polymer-enriched liquid phase has a higher polymer content when compared with the polymer-lean vapour phase. This is easily understood when considering the process occurring in the low pressure separator: Passing the unreduced reactor effluents from each of the reactors (2, 8) through the corresponding low pressure separators (3, 9) and adjusting the temperature and pressure of the low pressure separators results a liquid phase and a vapour phase. A skilled person will understand that the vapour stream may contain a minor amount of liquid (by volume), e.g. liquid droplets and polymer particles. A person skilled will also understand that the liquid stream may contain a minor amount of vapour, such as vapour bubbles.

DETAILED DESCRIPTION

Figure 1:
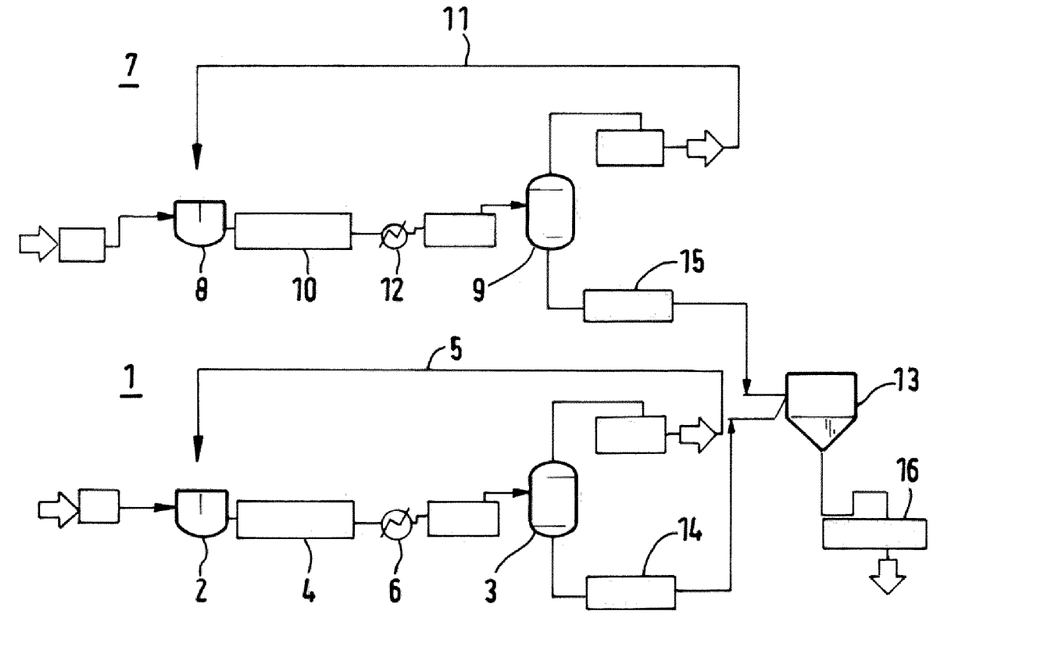

FIG. 1 shows the configuration of two reactor-low pressure separator units comprising a first reactor low pressure separator unit 1 including a first reactor 2 and a first low pressure separator 3, a first connecting line 4 connecting the first reactor 2 and the first low pressure separator 3 passing unreduced reactor effluents stream including a homogenous fluid phase polymer-monomer-solvent mixture, a first recycling line 5 connecting the first low pressure separator 3 back to the first reactor 2, a first heater 6 heating the unreduced reactor effluents stream.

The second reactor low pressure separator unit 7 includes a second reactor 8 and a second low pressure separator 9, a second connecting line 10 connecting the second reactor 8 and the second low pressure separator 9 passing unreduced reactor effluents stream including a homogenous fluid phase polymer-monomer-solvent mixture, a second recycling line 11 connecting the second low pressure separator 9 back to the second reactor 8, a second heater 12 heating the unreduced reactor effluents stream.

A third low-pressure separator and/or a mixer 13 may be connected by a third connecting line 14 connecting the first low pressure separator 3 and the third low pressure separator 13 passing the polymer-enriched liquid stream withdrawn from the first low pressure separator 3 and a fourth connecting line 15 connecting the second low pressure separator 9 and the third low pressure separator 13 passing the polymer-enriched phase liquid stream withdrawn from the first low pressure separator 9.

The combined polymer-enriched liquid stream is withdrawn from the third low-pressure separator and/or mixer 13 via line 16.

In the in-line blending process for polymers according to the present invention at least two reactor-low pressure separator units 1, 7 are used, whereby each reactor-low pressure separator unit includes one reactor 2, 8 and one low pressure separator 3, 9 downstream fluidly connected to the reactor 2, 8 and further a recycling line 5, 11 connecting only the reactor and the low pressure separator. The connection of the reactor 2, 8 and the low pressure separator 3,9 via a connecting line 4, 10 allows the feed of unreduced reactor effluents to the low pressure separator 3, 9. It is of course possible to operate three, four or even more reactor-low pressure separator units in such a parallel configuration. The polymer-enriched liquid streams withdrawn from all the low pressure separators of the reactor-low pressure separator units are all combined in the downstream low-pressure separator and/or mixer 13 to produce the combined polymer-enriched liquid stream which is withdrawn from the low-pressure separator and/or mixer 13 via line 16.

Polymerisation

In the reactors olefin monomers having two or more carbon atoms, one or more catalyst systems, optionally one or more comonomers, optionally one or more chain transfer agents, and optionally one or more diluents or solvents are used for initiating a liquid polymerization. Thus, the polymerization system for each reactor is in its dense fluid state and comprises the olefin monomers, any comonomer present, any diluent or solvent present, any chain transfer agent present, and the polymer product.

It is self explaining that the reaction conditions applied within the different reactor need not be the same but different when compared with each other. This allows the production of different polymers which finally are blended together. As the reaction conditions can be adjusted completely independent for the further reactor(s), the options for varying the microstructure of the polymers to be blended are very broad. For example the catalyst system, the pressures, the temperatures, the monomer feed, the comonomer/monomer ratio, feed of a chain transfer agent and the like can be different. There are countless opportunities.

The reactors to be used in the present invention are preferably selected from the group of tubular reactor, stirred autoclave, tank reactor, loop reactor, or combinations thereof.

The olefin monomer is an alpha-olefin having two or more carbon atoms, preferably from 2 to 10 carbon atoms. Suitable alpha-olefin monomers are selected from the group consisting of ethylene, propylene, 1-butene, 1-hexene, 1-octene, 1-decene, and styrene. More preferably the olefin monomer is selected from the group consisting of ethylene, propylene and 1-butene. Especially preferably the olefin monomer is ethylene or propylene.

One or more comonomers are optionally and preferably present in at least one of the polymerization reactors. The comonomer is selected from the group consisting of alpha-olefins different from the olefin monomer having from 2 to 12 carbon atoms; polyenes, such as non-conjugated alpha-omega-dienes, having from 4 to 12 carbon atoms, cyclic olefins having from 6 to 20 carbon atoms and cyclic polyenes having from 6 to 20 carbon atoms. Preferably, the comonomer is selected from the group of alpha-olefins different from the olefin monomer having from 2 to 12 carbon atoms, such as 1-butene, 1-hexene and 1-octene when the olefin monomer is ethylene; and ethylene, 1-butene and 1-hexene when the olefin monomer is propylene.

Suitably the comonomer is present in both of the polymerisation reactors. Same comonomer may be used in both polymerisation reactors but they may also be different if required, for instance, by product properties. Furthermore, the concentrations of the comonomer or comonomers in the two reactors are suitably different from each other. This allows production of homogeneous blends of two different polymers. However it is also possible to operate the reactors so that the concentrations of the comonomer or comonomers in the two reactors are the same.

The polymerisation catalyst may be any catalyst known in the art which is capable of polymerising the monomer and the optional comonomer. Thus, the polymerisation catalyst may be a Ziegler-Natta catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244, or it may be a combination of these. Also other suitable catalysts, such as late transition metal catalysts, can be used.

A chain transfer agent may be used in one or both of the polymerisation reactors for controlling the molecular weight of the polymer as it is known in the art. A suitable chain transfer agent is, for instance, hydrogen. By maintaining different concentrations of the chain transfer agent in the two reactors it is possible to produce a polymer blend having a broadened molecular weight distribution.

The solvent is suitably present in the polymerisation process. The solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. The solvent must be inert towards the polymerisation catalyst and the monomers. Further, it should be stable in the polymerisation conditions. It further must be able to dissolve the monomer, the eventual comonomers, the eventual chain transfer agent and the polymer in the polymerisation conditions.

The temperature in the reactors is such that the polymer formed in the polymerisation reaction is completely dissolved in the reaction mixture comprising the solvent, the comonomer(s), the chain transfer agent and the polymer. The temperature is suitably greater than the melting temperature of the polymer. Thus, when the polymer is a homo- or copolymer of ethylene the temperature is suitably from 120° C. to 240° C., such as from 140° C. to 220° C., most preferably from 150° C. to 200° C., depending on the content of comonomer units in the polymer. When the polymer is a homo- or copolymer of propylene the temperature is suitably from 120° C. to 250° C., such as from 140° C. to 235° C., most preferably from 150° C. to 225° C., depending on the content of comonomer units in the polymer.

The pressure in the reactor depends on the temperature, on one hand, and the type and the amount of the comonomer, on the other hand. The pressure is suitably from 50 to 300 bar, preferably from 60 to 250 bar and more preferably from 70 to 200 bar.

The process is suitably operated continuously. Thereby streams of monomer, catalyst and when present streams of comonomer, chain transfer agent and solvent are passed to the reactor(s) 2, 8. A product stream, such as the unreduced reactor effluents stream, comprising the unreacted monomer, dissolved polymer and optional unreacted comonomer and chain transfer agent as well as the optional solvent is withdrawn from the reactor 2, 8.

In a preferred aspect, one of the two or more reactors 2, 8 polymerizes a homopolymer or a random co-polymer and one of the at least two or more reactors polymerizes a copolymer. This allows the modification of the comonomer distribution in the final polymer. For example, if the aim is the incorporation of comonomer into a specific molecular weight range, one of the reactors 2, 8 may be operated such that this specific molecular weight is approximated and comonomer is used. In the parallel reactor no comonomer may be used and the conditions may be adapted such that said specific molecular weight range obtained in the parallel reactor is essentially avoided. The homopolymer is preferentially chosen from isotactic polypropylene, syndiotactic polypropylene, atactic polypropylene, polyethylene, polybutene, polybutadiene, polypentene, polyhexene, polyheptene, polyoctene, polydecene, and polystyrene.

When a copolymer is produced, this preferably chosen from ethylene-propylene, propylene-butene-1, propylene-pentene-1 propylene-hexene-1, propylene-heptene-1, propylene-octene-1, propylene-decene-1, ethylene-butene-1, ethylene-pentene-1, ethylene-hexene-1, ethylene-heptene-1, ethylene-octene-1 copolymers and mixtures thereof. Such copolymers are of particular interest, if the second polymer to be blended is a homopolymer or a random copolymer. Preferably, one or more of the polymers are combined.

The preferred process conditions in the reactors are at a temperature of preferably least 120° C., more preferably at least 140° C. and most preferably at least 150° C. and a pressure of preferably at least at 5.0 MPa, more preferably at least at 6.0 MPa and most preferably at least 7.0 MPa.

In the process according to the present invention the volumetric ratio of the at least two reactors is preferably within 0.85/1.0 and 1.0/0.85 with respect to each other.

After initiation of the polymerization, an unreduced reactor effluents stream including a homogenous fluid phase polymer-monomer-solvent mixture is withdrawn from the reactor 2, 8. This step is carried out for any of the reactor-low pressure separators present, i.e. in the simplest configuration the step is carried out twice.

The unreduced reactor effluents stream preferably contains from 10 to 35% by weight polymer, more preferably from 12 to 30% by weight polymer, most preferably from 15 to 25% by weight polymer, based on the total weight content of the unreduced reactor effluents stream.

Heating

Before feeding the unreduced reactor effluents stream from the reactor 2, 8 to the low pressure separator 3,9 usually the stream is preheated in at least one heating step, preferably in two heating stages including a pre-heating stage and a final-heating stage.

Typically the temperature of the unreduced reactor effluents stream before entering the first heating step is from 120° C. to 240° C., preferably from 140° C. to 220° C., most preferably from 150° C. to 200° C., when the polymer is a homo- or copolymer of ethylene. Typically the temperature of the unreduced reactor effluents stream before entering the first heating step is from 120° C. to 250° C., preferably from 140° C. to 235° C. most preferably from 150° C. to 225° C., when the polymer is a homo- or copolymer of propylene.

The temperature of the unreduced reactor effluents stream immediately downstream of the pre-heating step is typically from 160° C. to 240° C. and preferably from 170° C. to 220° C., most preferably from 180° C. to 200° C., when the polymer is a homo- or copolymer of ethylene. The temperature of the unreduced reactor effluents stream immediately downstream of the pre-heating step is typically from 200° C. to 250° C. and preferably from 210° C. to 250° C., most preferably from 220° C. to 250° C., when the polymer is a homo- or copolymer of propylene.

It is preferred that the pressure of the unreduced reactor effluents stream is not substantially affected by the pre-heating step. The pressure is suitably from 50 to 300 bar, preferably from 50 to 250 bar and more preferably from 70 to 200 bar.

The unreduced reactor effluents stream is passed from the reactor(s) 2, 8 to the first heating step. The purpose of the first heating step is to preheat the first unreduced reactor effluents stream before it enters the separation step.

The pre-heating is usually effected by a heat exchanger 6, 12. For instance, the unreduced reactor effluents stream is distributed in a number of tubes and a heating fluid is passed to contact the tubes thereby heating the solution flowing therein.

The purpose of the pre-heating step is to recover the heat from the process streams thereby improving the economy of the process.

The heating fluid may be any process fluid which contains recoverable heat. Preferably the polymer-lean vapour stream recovered from the separation step is used as the heating fluid. During the process the heating fluid, e.g. the polymer-lean vapour stream, is cooled. It is preferred to withdraw so much heat from the polymer-lean vapour stream that at least a part of the polymer-lean vapour stream condenses in the first heating step.

The inventive configuration enables the transfer and advantageous use of heat obtained in the low pressure separators 3, 9. Thus, in a preferred embodiment, the pre-heating is accomplished by a heat exchanger 6, 12 transferring the excess heat from the separations in the low pressure separators on the unreduced reactor effluents stream.

When the pre-heating is effected by a heat exchanger 6, 12 transferring the heat from the polymer-lean vapour stream withdrawn from the low pressure separators 3, 9 on the unreduced reactor effluents stream from the two or more reactors 2, 8, the polymer-lean vapour stream cooled in the heat exchanger 6,12 is preferably at least partially condensed.

Preferably, the pre-heating is effected by a heat exchanger transferring the heat from the separation of step (d) on the unreduced reactor effluents from the two or more reactors, whereby the stream cooled in the heat exchanger is at least partially condensed.

When the unreduced reactor effluents stream from the two or more reactors 2,8 is heated in two stages including a pre-heating stage and a final-heating stage, the final-heating stage preferably includes heating of the stream to at least 200° C.

Preferably, the final-heating stage includes heating of the unreduced reactor effluents stream to preferably at least at 180° C., more preferably at least at 200° C. and most preferably at least 210° C.

The purpose of the final heating step is to heat the unreduced reactor effluents stream to a required temperature for the separation step. The final heating step may be required because the recoverable heat in the heating medium in the pre-heating step may be insufficient for reaching the desired temperature of the unreduced reactor effluents stream.

The final heating step may be conducted by using similar principles as the pre-heating step. However, the temperature of the heating fluid used in the final heating step is suitably controlled to a temperature which allows heating of the unreduced reactor effluents stream to the desired temperature. Thereby it is preferred that the stream of the heating fluid used in the final heating step is heated to a desired temperature prior to introducing it into the final heating step.

According to one embodiment of the invention the temperature of the unreduced reactor effluents stream is measured downstream of the pre-heating step and the flow rate of the heating fluid used in the final heating step is adjusted based on the difference between the measured temperature and the desired temperature of the unreduced reactor effluents stream.

The temperature of the unreduced reactor effluents stream downstream of the final heating step is typically from 200° C. to 300° C., preferably from 210° C. to 260° C. and more preferably from 210° C. to 230° C., when the polymer is a homo- or copolymer of ethylene. The temperature of the unreduced reactor effluents stream downstream of the final heating step is typically from 200° C. to 300° C., preferably from 210° C. to 270° C. and more preferably from 220° C. to 250° C., when the polymer is a homo- or copolymer of propylene.

It is preferred that the pressure of the unreduced reactor effluents stream is not substantially affected by the final heating step. The pressure is suitably from 50 to 300 bar, preferably from 50 to 250 bar and more preferably from 70 to 200 bar.

Separation

The unreduced reactor effluents stream from the reactor 2, 8 is fed to the low pressure separator 3,9 which is allocated to said reactor 2, 8 thereby forming the reactor-low pressure separator unit 1, 7. In the low pressure separator unit 1, 7 the temperature and pressure will be adjusted such that a liquid phase and a vapour phase are obtained. The polymer is dissolved in the liquid phase which comprises a part of the eventual solvent and a part of the eventual unreacted comonomer while most part of the unreacted monomer, eventual unreacted chain transfer agent, eventually a part of the unreacted comonomer, and eventually, a part of the solvent form the vapour phase.

The temperature in the separation step is suitably within the range of from 120° C. to 240° C., preferably from 140° C. to 220° C. and more preferably from 150° C. to 200° C., when the polymer is a homo- or copolymer of ethylene. The temperature in the separation step is suitably within the range of from 120° C. to 240° C., preferably from 140° C. to 220° C. and more preferably from 150° C. to 200° C., when the polymer is a homo- or copolymer of propylene.

The pressure in the separation step is from 1 to 15 bar, preferably from 2 to 12 bar and more preferably from 5 to 10 bar.

The conditions in the separation step should be as such that no unwanted polymerization downstream the reactors can occur which would necessitate killing of the polymerization catalysts usually with polar substances. Thus, in a preferred aspect of the present invention no catalyst killing is added to the unreduced reactor effluents stream before or during the separation step.

In another aspect of the present invention, which, however, is not preferred, catalyst killing agent is added to the unreduced reactor effluents stream before or during the separation step. The catalyst killing agent is usually a polar component such as water, alcohols (such as methanol and ethanol), sodium/calcium stearate, CO, and combinations thereof.

As discussed above, the conditions in the separation step need to be such that the vapour phase and the liquid phase are formed. Thereby the recycle of the reactants to the reactors can be maintained as simple as possible.

Hence, a polymer-enriched phase and a polymer-lean phase are obtained. The temperature and pressure are set such that vapour-liquid separation takes place and a two-phase system comprising a polymer-rich liquid phase and a polymer-lean vapour phase results. These two phases are then separated from each other.

The polymer-lean vapour phase is then separated from the polymer-enriched liquid phase in each of the low-pressure separators to form separated polymer-lean vapour streams and polymer-enriched liquid streams.

The separation step may be conducted according to any separation method known in the art where a liquid phase and a vapour phase coexist. It is preferred to conduct the separation step as a flashing step, because of the easiness of operation. As it is well known in the art the liquid feed is passed to a vessel operated at a reduced pressure. Thereby a part of the liquid phase vaporises and can be withdrawn as an overhead stream (or a vapour stream) from the flash. The part remaining in liquid phase is then withdrawn as a bottom stream (or a liquid stream).

The advantage of having a vapour phase and a liquid phase present in the separation step is for the first a simple apparatus and thus low investment cost. In addition, the carry-over of polymer with the vapour stream is minimal. A concentrated polymer-enriched liquid stream is withdrawn from the liquid phase of the separation step.

In a preferred embodiment the separation step is a flashing step as discussed below. The flashing step is suitably conducted in a flash vessel which is a vertical vessel preferably having a generally cylindrical shape. Thereby the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The temperature in the flash vessel is typically from 120 to 240° C. The temperature should be sufficiently high to keep the viscosity of the liquid stream at a suitable level but less than the temperature where the polymer is degraded. The pressure in the flash vessel is typically from 15 bar to atmospheric, or even less than atmospheric.

The unreduced reactor effluents stream enters the flash vessel at the top. The liquid stream travels downwards in the flash vessel while the gases which evaporate from the liquid stream travel upwards. According to this preferred embodiment the liquid stream forms a thin film which falls downwards in the flash vessel. This facilitates the removal of hydrocarbons from the liquid stream. The vapour stream formed from the evaporated gases is typically withdrawn from the top of the flash vessel while the liquid stream is withdrawn from the bottom.

According to an especially preferred embodiment the unreduced reactor effluents stream is sprayed in the flash vessel. The spraying can be done by using one or more suitable nozzles which disperse the unreduced reactor effluents stream into droplets. Such nozzles are well known in the industry and include air atomising nozzles, flat fan nozzles, hollow cone nozzles and full cone nozzles. Preferably the nozzles break the stream into droplets having the size of not more than about 1 mm.

The nozzle forms a stream of droplets in the flash vessel. The stream of droplets then coagulates within the flash vessel and forms a falling film having a relatively high surface area. This enhances the mass transfer of the volatile components from the solution.

As described above the flash vessel can have a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle it moves in the direction of the wall forming a downwards falling film. It is also possible that the flash vessel has a vertical generally conical shape. In such embodiment it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements the liquid stream forms a falling film within the flash vessel.

The polymer content in polymer-enriched liquid stream withdrawn from the flashing stage is typically from 40 to 90% by weight, preferably from 50 to 80% by weight and most preferably from 60 to 75% by weight, based on the total weight content of the polymer-enriched liquid stream. In other words, the polymer-enriched liquid stream withdrawn from the flashing stage typically contains from 10 to 60% by weight, preferably from 20 to 50% by weight and most preferably from 25 to 40% by weight of residual hydrocarbons, based on the total weight content of the polymer-enriched liquid stream.

When viewed from a different angle, the polymer-lean vapour stream withdrawn from the flash vessel is from 35 to 80% by weight from the total material streams withdrawn from the flash vessel. The polymer-lean vapour stream typically comprises unreacted monomer and also solvent and unreacted comonomer.

By using the flash as described above it is possible to achieve high separation efficiency. For instance, separation efficiency for hydrocarbons containing 6 carbon atoms is at least 75% and preferably at least 80%. Additionally still, separation efficiency for hydrocarbons containing 8 carbon atoms is at least 60% and preferably at least 65%. The separation efficiency is defined as the mass flow of the component withdrawn in the vapour stream divided by the (theoretical) mass flow rate of the component in the vapour stream in equilibrium conditions.

The preferred process conditions in the low pressure separators are at a pressure of preferably less than 1.5 MPa, more preferably less than 1.2 MPa and most preferably less than 1.0 MPa and at a temperature of preferably less than 240° C., more preferably less than 220° C. and most preferably less than 200° C.

The polymer-enriched liquid streams from the low-pressure separators 3, 9 are blended together in a further low-pressure separator and/or a mixer 13.

In a preferred aspect the polymer-enriched liquid streams are heated before, during or after said combination.

A further low-pressure separator is usually only used when the above described separation efficiency in the low-pressure separators 3, 9 is not sufficient, i.e. the content of residual hydrocarbons in polymer-enriched liquid streams withdrawn from the low-pressure separators 3, 9 is rather high.

When a further low pressure separator 13 is used for blending the polymer enriched liquid streams, i.e. practically streams consisting essentially of polymer only, the thereby obtained further polymer-lean vapour phase may be recycled back as polymer-lean vapour stream to any or all of the reactors. This coupling of the reaction streams is usually of no harm, as the monomer content of the polymer enriched liquid stream is already very low before entering the final mixing stage. In the optional separation step within the low-pressure separator the temperature and pressure are maintained to form a vapour-liquid two-phase system comprising a combined polymer-enriched liquid phase and a combined polymer-lean vapour phase. The combined polymer-lean vapour phase is separated from the combined polymer-enriched liquid phase in the further low-pressure separator 13 to form a combined polymer-enriched rich liquid stream and a separated combined polymer-lean vapour stream. The combined polymer-lean vapour stream is recycled back to the reactor 2,8 from which the unreduced reactor effluents originate for each of the two or more reactors present. Optionally the separated combined polymer-lean vapour stream is recycled to one or more of the reactors.

When a mixer 13 is used for blending the polymer enriched liquid streams the mixer is suitably a static mixer. Static mixers are well known in the art and the person skilled in the art is capable of selecting a suitable mixer for the process. The use of the mixer enhances the mixing of the polymer-enriched liquid streams, on one hand, and the mass transfer of the volatile components from the liquid phase to the vapour phase, on the other hand by substantially increasing the mass transfer area.

It is possible to add additives, such as antioxidants, process stabilisers, UV-stabilisers, antiblocking agents and acid scavengers to the polymer solution upstream the low pressure separator and/or mixer 13. Such an arrangement allows dispersing the additives homogeneously within the polymer.

Further preferably the inventive process comprises steps of removing low molecular weight oligomers, low molecular weight polymers, solvents/diluents or combinations thereof from the separated polymer lean vapour phases of step (d), i.e. in the low pressure separators and/or step (f), i.e. in the final blending stage which is a further low pressure separator and/or a mixer. The combination of a mixer and a subsequently arranged further low pressure separator is preferred for this purpose.

Vapour Stream Recycle

The polymer-lean vapour streams obtained in the low pressure separators 3,9 are recycled back to the corresponding reactors (2,8) from which the unreduced reactor effluents streams originated. For this purpose recycling lines 5 and 11 are used. As has been explained with respect to the reactor-low pressure separator units, decoupling of the streams is advantageous. Thus, the polymer lean vapour stream originating from a first reactor is recycled back to the first reactor, whereas the polymer lean vapour stream originating from a second reactor is recycled back to the second reactor. Recycling itself reduces flaring and further reduces the cost due to less consumption of raw material.

A vapour stream is withdrawn from the vapour phase in the separation step. Preferably heat in the vapour stream is recovered before passing it to the polymerisation reactors. Preferably, at least a part of the vapour stream is passed to a first heating step for heating the solution stream. This is done for each of the reactor present. There is no recycling of polymer-lean vapour streams back to one of the other reactors operated in parallel. In other words, the strict recycling rule avoids any detrimental interaction of the polymerization conditions used in the different reactors.

In the first heating step the heat carried by vapour stream is transferred to the unreduced reactor effluents stream. The first heating step is preferably conducted in a heat exchanger 6, 12, where the heat is transferred to the unreduced reactor effluents stream and consequently the vapour stream is cooled. The vapour stream may cool to an extent that a part of it condenses.

The vapour stream is then optionally passed to a condensing step. In the condensing step the vapour phase is partly condensed to form a condensed vapour stream and an uncondensed vapour stream. The condensing step is useful when the concentration of one of the components of the vapour stream, usually the concentration of the chain transfer agent, such as hydrogen, is higher than in the polymerisation reactor. Then hydrogen is separated in the condensing step from the condensed vapour stream. It is also possible, and preferred, that the vapour stream already has been condensed in the first heating step. Thereby no separate condensing step is needed but the first heating step serves as condensing step.

The partially condensed vapour stream may then be separated into a condensed vapour stream and an uncondensed vapour stream. This can be done, for instance, in a vessel. The partially condensed vapour stream is passed to the vessel where the condensed fraction remains as a liquid and the uncondensed fraction remains as a vapour. The condensed vapour stream is then withdrawn from the liquid phase and the uncondensed vapour stream is withdrawn from the vapour phase.

The condensed vapour stream is returned to only to the accordant polymerisation reactor 2, 8 of its reactor-low pressure separation unit 1, 7.

The uncondensed vapour stream containing excess components such as excess hydrogen is discharged. In the case that the uncondensed vapour stream does not contain any components in excess to their concentration in the polymerisation reactor 2,8 the uncondensed vapour stream is reintroduced into the reactor 2,8.

In the non-preferred embodiment that unwanted polymerisation downstream the reactors has been prevented by addition of catalyst killing agents as described above, said catalyst killing agents have to be removed from the polymer-lean vapour stream e.g. by the use of fixed bed absorbents or by scavenging with an aluminium alkyl.

Important aspect of the present invention shall be summarized in the following clauses.

1. An in-line blending process for polymers comprising:
   (a) providing two or more reactor-low pressure separator units (1,7) in parallel configuration, each reactor-low pressure separator unit comprising one reactor (2,8) fluidly connected to one low pressure separator (3,9) downstream and further a recycling line (5,11) connecting the low pressure separator (3,9) back to the corresponding reactor (2,8);
   (b) contacting in the two or more reactors of each reactor-low pressure separator unit (1,7)
      1) olefin monomers having two or more carbon atoms,
      2) one or more catalyst systems,
      3) optional one or more comonomers,
      4) optional one or more chain transfer agents, and
      5) optional one or more diluents or solvents,
   wherein the reactors (2,8) are operated under operating conditions which ensure that the reactor contents form a single homogenous phase, the reactor contents comprising the olefin monomers, any comonomer present, any diluent or solvent present, any chain transfer agent present, and the polymer product;
   whereby the catalyst system for each reactor comprises one or more catalyst precursors, one or more activators, and optionally, one or more catalyst supports;
   (c) forming an unreduced reactor effluents stream including a homogenous fluid phase polymer-monomer-solvent mixture in each of the reactors (2,8),
   (d) passing the unreduced reactor effluents from each of the reactors (2,8) through the corresponding low pressure separators (3,9),
   whereby the temperature and pressure of the low pressure separators is adjusted such that a liquid phase and a vapour phase are obtained, whereby yielding a polymer-enriched liquid phase and a polymer-lean vapour phase, and
   (e) separating the polymer-lean vapour phase from the polymer-enriched liquid phase in each of the low-pressure separators (3,9) to form separated polymer-lean liquid streams and separated polymer-enriched vapour streams;
   (f) combining the polymer-enriched liquid streams from step (e) in a further low-pressure separator and/or a mixer (13) to produce a combined polymer-enriched liquid stream,
   (g) Reintroducing the polymer-lean vapour streams from step (e) via recycling lines (5,11) into the corresponding reactor (2,8).

2. The process of clause 1 comprising a step of heating the unreduced reactor effluents stream of (c).

3. The process of clause 2 comprising a step of heating the unreduced reactor effluents stream of (c) in two stages including a pre-heating stage and a final-heating stage.

4. The process of clause 3 wherein the pre-heating is effected by a heat exchanger transferring heat from the separation of (d) on the unreduced reactor effluents from the two or more reactors.

5. The process of any of the preceding clause, wherein at least one of the reactor includes a solvent mixture of hydrocarbons with major components having a number of carbon atoms between 4 and 9; i.e. $C_4$-$C_9$.

6. The process of any of the preceding clauses wherein the optional one or more comonomers of (b) comprise one or more of ethylene, propylene, butenes, pentenes, hexenes, heptenes, octenes, decenes, or dodecenes.

7. The process of any of the preceding clauses wherein one of the two or more reactors polymerizes a homopolymer or a random co-polymer and wherein one of the at least two or more reactors polymerizes a copolymer.

8. The process of clause 7 wherein the homopolymer is chosen from isotactic polypropylene, syndiotactic polypropylene, atactic polypropylene, polyethylene, polybutene, polybutadiene, polypentene, polyhexene, polyheptene, polyoctene, polydecene, and polystyrene.

9. The process of clause 7 or 8 wherein the copolymer is chosen from ethylene-propylene, propylene-butene-1, propylene-pentene-1 propylene-hexene-1, propylene-heptene-1 propylene-octene-1, propylene-decene-1, ethylene-butene-1, ethylene-pentene-1, ethylene-hexene-1, ethylene-heptene-1, ethylene-octene-1 copolymers.

10. The process of clause 9 where one or more copolymers are combined.

11. The process of any of the preceding clauses further comprising separating low molecular weight oligomers, low molecular weight polymers, solvents/diluents or combinations thereof from the separated polymer-lean vapour phases of (d).

12. The process of any of the preceding clauses, wherein combining in step (f) of the polymer-enriched liquid streams is effected by a mixer and by a subsequently arranged further low-pressure separator.

13. The process of clause 12, whereby the polymer-enriched liquid streams of step (e) are heated before, during or after combination.

14. The process of any of the preceding clauses wherein one or more of the reactors are selected from the group of tubular reactor, stirred tank, autoclave reactor, loop reactor, or combinations thereof.

15. The process of any of the preceding clauses wherein the low pressure separators are operated at a pressure of preferably less than 1.5 MPa, more preferably less than 1.2 MPa and most preferably less than 1.0 MPa and at a temperature of preferably less than 240° C., more preferably less than 220° C. and most preferably less than 200° C.

16. The process of any of the preceding clauses wherein the reactors are operated at a temperature of preferably at least 120° C., more preferably at least 140° C. and most preferably at least 150° C. and a pressure of preferably at least at 5.0 MPa, more preferably at least at 6.0 MPa and most preferably at least 7.0 MPa.

17. The process of any of the preceding clauses wherein the volumetric ratio of the at least two reactors is within 0.85/1.0 and 1.0/0.85 with respect to each other.

18. The process of clause 4 wherein the pre-heating is affected by a heat exchanger transferring the heat from the separation of (d) on the unreduced reactor effluents stream from the two or more reactors, whereby the stream cooled in the heat exchanger is at least partially condensed.

19. The process of clause 4, whereby the coolant is the vapour from one or more of the low-pressure separator(s).

20. The process of clauses 18, 19 or 4, wherein the final-heating stage includes heating of the unreduced reactor effluents stream to preferably at least at 180° C., more preferably at least at 200° C. and most preferably at least 210° C.

21. The process according to any of the preceding clauses, wherein the polymer lean vapour streams are recycled back to the corresponding reactors via recycling lines (5, 11).

EXAMPLES

Computer simulations were performed using Aspen 8.8 computer software. In the simulation a solution withdrawn from the reaction stage containing 21.2 wt % of a copolymer of ethylene and 1-octene, 0.9 wt % of unreacted ethylene monomer, and 77.9 wt % of n-hexane solvent together with unreacted 1-octene comonomer in example E1 was separated in a flash separator (vapour-liquid separator). Thereby, the temperature of the solution stream was assumed to be 220° C. before entering the flash separator and the pressure was assumed to be 90 barg before entering the flash separator and 9 barg in the flash separator. In comparative example CE2 was separated in a liquid-liquid separator. Thereby, the temperature of the solution stream was assumed to be 220° C. before entering the liquid-liquid separator and the pressure was assumed to be 30-45 barg in the liquid-liquid separator. Comparison of the process flows are shown in Table 1.

TABLE 1

| Top stream | E1 Vapour | CE2 Liquid |
|---|---|---|
| Amount of solution stream in top stream | 67.5 wt % | 46 wt % |
| Amount polymer in top stream | 0 wt % | 0.1 wt % |
| Amount ethylene in top stream | 1.4 wt % | 1.9 wt % |
| Amount solvent + comonomer in top stream | 98.6 wt % | 98.0 wt % |
| Bottom stream | Liquid | Liquid |
| Amount of solution stream | 32.5 wt % | 54 wt % |
| Amount polymer in bottom stream | 65 wt % | 40 wt % |
| Amount ethylene in bottom stream | 0 wt % | 0 wt % |
| Amount solvent + comonomer in bottom stream | 35 wt % | 60 wt % |

From the comparison it can be seen that the flash separation is more efficient as the liquid-liquid separation which can be seen in the higher polymer concentration in the bottom stream. The lower amount of liquid bottom stream of 32.5 wt % from the total amount of solution stream in E1 compared to 54 wt % allows the use of smaller downstream separators for the further concentration and separation of the polymer.

The invention claimed is:

1. An in-line blending process for polymers comprising:
   (a) providing two or more reactor-low pressure separator units (1,7) in parallel configuration, each reactor-low pressure separator unit comprising one reactor (2,8) fluidly connected to one low pressure separator (3,9) downstream and further a recycling line (5,11) connecting the low pressure separator (3,9) back to the corresponding reactor (2,8);
   (b) contacting in the two or more reactors (2,8) of each reactor-low pressure separator unit (1,7)
      1) olefin monomers having two or more carbon atoms,
      2) one or more catalyst systems,
      3) optionally one or more comonomers,
      4) optionally one or more chain transfer agents, and
      5) optionally one or more diluents or solvents,
      wherein the reactors (2,8) are operated under operating conditions which ensure that the reactor contents form a single homogeneous phase, the reactor contents comprising the olefin monomers, any comonomer present, any diluent or solvent present, any chain transfer agent present, and the polymer product;
      whereby the catalyst system for each reactor comprises one or more catalyst precursors, one or more activators, and optionally, one or more catalyst supports;
   (c) forming an unreduced reactor effluents stream including a homogeneous fluid phase polymer-monomer-solvent mixture in each of the reactors (2,8);
   (d) passing the unreduced reactor effluents streams from each of the reactors (2,8) through the corresponding low pressure separators (3,9),
      whereby the temperature and pressure of the low pressure separators (3,9) is adjusted such that a liquid phase and a vapour phase are obtained, thereby yielding a polymer-enriched liquid phase and a polymer-lean vapour phase;
   (e) separating the polymer-lean vapour phase from the polymer-enriched liquid phase in each of the low-pressure separators (3,9) to form separated polymer-lean vapour streams and separated polymer-enriched liquid streams;
   (f) combining the polymer-enriched liquid streams from step (e) in a further low-pressure separator and/or a mixer (13) to produce a combined polymer-enriched liquid stream (16);
   (g) reintroducing the polymer-lean vapour streams from step (e) via recycling lines (5,11) into the corresponding reactors (2,8).

2. The process of claim 1, comprising a step of heating the unreduced reactor effluents stream of (c).

3. The process of claim 2, comprising a step of heating the unreduced reactor effluents stream of (c) in two stages including a pre-heating stage and a final-heating stage.

4. The process of claim 3, wherein the pre-heating is effected by a heat exchanger transferring heat from the separation of (d) on the unreduced reactor effluents from the two or more reactors.

5. The process of claim 3, wherein the final-heating stage includes heating of the unreduced reactor effluents stream at least 180° C.

6. The process of claim 5, wherein the final-heating stage includes heating of the unreduced reactor effluents stream at least 200° C.

7. The process of claim 6, wherein the final-heating stage includes heating of the unreduced reactor effluents stream at least 210° C.

8. The process of claim 1, wherein at least one of the reactors includes a solvent mixture of hydrocarbons with major components having a number of carbon atoms between 4 and 9, i.e. $C_4$-$C_9$.

9. The process of claim 1, wherein the optional one or more comonomers of (b) comprise one or more of ethylene, propylene, butenes, pentenes, hexenes, heptenes, octenes, decenes, or dodecenes.

10. The process of claim 1, wherein one of the two or more reactors polymerizes a homopolymer or a random co-polymer and wherein one of the at least two or more reactors polymerizes a copolymer.

11. The process of claim 10, wherein the homopolymer is chosen from isotactic polypropylene, syndiotactic polypropylene, atactic polypropylene, polyethylene, polybutene, polybutadiene, polypentene, polyhexene, polyheptene, polyoctene, polydecene, and polystyrene.

12. The process of claim 10, wherein the copolymer is chosen from ethylene-propylene, propylene-butene-1, propylene-pentene-1, propylene-hexene-1, propylene-heptene-1, propylene-octene-1, propylene-decene-1, ethylene-butene-1, ethylene-pentene-1, ethylene-hexene-1, ethylene-heptene-1, and ethylene-octene-1 copolymers.

13. The process of claim 1, further comprising separating low molecular weight oligomers, low molecular weight polymers, solvents/diluents, or combinations thereof from the separated polymer-lean vapour phases of step (d).

14. The process of claim 1, wherein combining the polymer-enriched liquid streams in step (f) is effected by a mixer and by a subsequently arranged further low-pressure separator.

15. The process of claim 1, whereby the polymer-enriched liquid streams of step (e) are heated before, during, or after combination.

16. The process of claim 1, wherein the low pressure separators are operated at a pressure of less than 1.5 MPa and at a temperature of less than 240° C.

17. The process of claim 16, wherein the low pressure separators are operated at a pressure of less than 1.2 MPa and at a temperature of less than 220° C.

18. The process of claim 17, wherein the low pressure separators are operated at a pressure of less than 1.0 MPa and at a temperature of less than 200° C.

19. The process of claim 1, wherein the polymer content in the separated polymer-enriched liquid phase from step (e) is from 40 to 90% by weight, based on the total weight content of the separated polymer-enriched liquid phase.

* * * * *